United States Patent [19]

Deeg et al.

[11] 3,954,656

[45] May 4, 1976

[54] LASER GLASSES WITH HIGH DAMAGE THRESHOLD AND METHOD OF MAKING SUCH GLASSES

[75] Inventors: Emil W. Deeg, Woodstock, Conn.; Robert E. Graf, Southbridge, Mass.

[73] Assignee: American Optical Corporation, Southbridge, Mass.

[22] Filed: June 3, 1974

[21] Appl. No.: 475,532

Related U.S. Application Data

[60] Division of Ser. No. 353,144, April 20, 1973, Pat. No. 3,830,749, which is a continuation of Ser. No. 148,225, May 28, 1971, abandoned, which is a continuation of Ser. No. 801,800, Feb. 24, 1969, abandoned.

[52] U.S. Cl. .............................. 252/301.4 F; 106/52
[51] Int. Cl.² ................... C09K 11/08; C03C 3/04; C03C 3/30
[58] Field of Search ........................... 252/301.4 F; 331/94.5 E; 106/52

[56] References Cited
UNITED STATES PATENTS

| | | | |
|---|---|---|---|
| 3,422,025 | 1/1969 | Switzer et al. | 252/301.4 F |
| 3,471,409 | 10/1969 | Lee et al. | 252/301.4 F |
| 3,535,266 | 10/1970 | Lee | 252/301.4 F |

*Primary Examiner*—Winston A. Douglas
*Assistant Examiner*—Mark Bell
*Attorney, Agent, or Firm*—H. R. Berkenstock, Jr.; William C. Nealon

[57] ABSTRACT

Laser glasses having high resistance to self-damage during operation are formed in all ceramic melting units, in the presence of a fining agent to eliminate the formation of metallic inclusions and semi-conductive inclusions and using base glass compositions with reduced tendency toward microphase separation and devitrification. The major ingredients of the glass batches include silicon dioxide, alkali and alkaline earth nitrates, carbonates and fluorides. The method involves introducing oxidizing compounds into the reaction mixture in a sufficient amount that during the reaction and fining phase, oxidizing conditions are maintained throughout the entire volume of the glass melt.

5 Claims, No Drawings

LASER GLASSES WITH HIGH DAMAGE THRESHOLD AND METHOD OF MAKING SUCH GLASSES

This is a division of application Ser. No. 353,144, filed Apr. 20, 1973, now U.S. Pat. No. 3,830,749, which is a continuation of application Ser. No. 148,225, May 28, 1971 (now abandoned) which was a continuation of application Ser. No. 801,800 filed Feb. 24, 1969 (now abandoned).

When in operation, lasers produce tremendous amounts of energy, and this energy internally of the glass of the laser causes metallic and semi-conductive inclusions in the glass to expand, move, vaporize, etc., and thus crack or explode the laser glass. The greatest amount of energy density that can be propagated without damage to the glass is termed the damage threshold of that glass. Heretofore, laser glasses have been prepared in either platinum or ceramic pots. However, at the high temperature required to melt the laser glass, platinum vaporizes, is oxidized in the gaseous state, decomposes on cooling, and precipitates into the melted glass as platinum inclusions. In the known prior art no attempt has been made to consider the composition of the glass itself and its contributions to the formation of metallic or semi-conductive inclusions. The prior art seems to be concerned only with the effects of the melting pots themselves or the atmosphere over the glass in the pots. All known laser glasses include fining agents (bubble formers), and the most widely used fining agent is antimony oxide, $Sb_2O_3$.

A further problem with laser glasses is an effect called "solarization", which can occur when glasses are exposed to ultraviolet radiation. If that process takes place preferably in small areas within the structure of a laser glass, dark spots are formed which absorb the energy produced by the laser and act as damage centers.

Self-damage of glass laser rods during operation is usually caused by localized energy concentrations at the metallic or semi-conductive inclusions in the rods or on the surface of the rods. As stated above, it has been widely accepted knowledge in the prior art that the only metallic inclusions considered to be important in the self-damage of laser rods are the platinum or other metal inclusions originating from crucibles and/or stirrers for the melt or even improperly protected thermocouples and heating elements in the furnace. In order to avoid such inclusions, laser glasses for high power systems have heretofore been manufactured in all ceramic melting units. In other attempts to avoid the formation of the metal inclusions, the melting and/or refining of the laser glasses has been conducted under a neutral atmosphere. The prior art, furthermore, indicates that some glass melts performed under balanced redox conditions result in glasses which are more stable to solarization.

According to the present invention we have discovered that a laser glass melt containing alkali metal or alkaline earth metal compounds such as nitrates, carbonates, sulfates, cabonates, etc. or mixtures of such compounds under oxidizing conditions produces a high damage threshold laser glass. The method of the invention includes selecting a base glass composition with a low tendency towards microphase separation and/or localized crystallization with combinations of batch compositions and melting such compositions in ceramic crucibles under oxidizing conditions. The base glass composition includes ions having a high field strength which gives a laser glass with a high damage threshold. The method of the invention eliminates the formation of metallic or semi-conductive inclusions in laser glass melts. Further, there is eliminated internal breakdown of the glass due to laser radiations by providing a glass composition having a low tendency to form localized areas containing mobile ions and sources of internal field emission which in turn is known as a reason for dielectric breakdown.

Preferably the batch of laser glass should not contain compounds of the noble metals and/or any of the following elements; antimony, arsenic, zinc, lead, tin, cadmium, bismuth, selenium, tellurium or copper, and generally transition elements, 4a, 5a and 6a group metals. The batch of laser glass must contain fining agents which may be salts of alkali and alkaline earth metals, preferably nitrates of sodium, potassium and ammonia. Nitrates are preferred since they promote an oxidizing system. The glass batch is thoroughly mixed eliminating the introduction of metallic particles and/or reducing materials such as organic dust particles, chips of plastics, silicon carbide particles, etc., and the melting and fining is done in an all ceramic unit. On completion of fining and conditioning, the glass is shaped using known techniques such as casting, extruding, pressing or drawing.

Included among the objects and advantages of the present invention is a laser glass with a high damage threshold with essentially no metallic or semi-conductive inclusions.

Another object of the invention is to provide a method of making a laser glass having a high damage threshold and without the formation of localized metallic and/or semi-conductive inclusions.

A further object of the invention is to provide fining agents for laser glass which consists essentially of alkali, and alkaline metal, and ammonium salts.

These and other objects and advantages of the invention may be readily ascertained by referring to the following description and examples wherein the glass melt is made according to known techniques and the resulting glass is shaped by such known techniques casting, extruding, pressing or drawing.

In general, the composition of the laser glass, made according to the invention, contains ingredients found in the following list, within the weight per cent listed:

TABLE I

| | |
|---|---|
| $SiO_2$ | 40–80 wt. % |
| $Li_2O$ | 0–20 |
| $Na_2O$ | 0–12 |
| $K_2O$ | 0–25 |
| $Rb_2O$ | 0–10 |
| $Cs_2O$ | 0–10 |
| MgO | 0–20 |
| CaO | 0–20 |
| SrO | 0–25 |
| BaO | 0–25 |
| $B_2O_3$ | 0–20 |
| $Al_2O_3$ | 0–20 |
| $Nd_2O_3$ | 2–6 |
| $Yb_2O_3$ | 0–4 |

The summation of all the weight per cents must equal 100 weight per cent, and contains at least one alkali metal or alkaline earth oxide.

Specific examples of the ingredients for glass batches used in the process are shown in the following two tables:

TABLE II

| Batch No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 266.28 | 257.88 | 264.00 | 264.00 | 264.00 | 252.00 | 304.00 | 224.00 | 208.00 | 272.00 | 268.00 | 204.00 | 240.00 | 240.00 |
| $LiNO_3$ | — | — | — | 332.64 | — | 277.20 | — | 295.68 | — | 277.20 | — | — | 64.68 | — |
| $K_2CO_3$ | 57.41 | 59.26 | 76.44 | — | 88.20 | — | 88.20 | — | — | — | 47.04 | — | — | — |
| $KNO_3$ | 84.00 | 81.27 | 25.80 | — | 25.80 | — | 25.80 | — | — | — | 8.60 | — | — | — |
| $NaNO_3$ | 23.02 | 23.02 | — | — | — | — | — | — | — | — | — | — | — | — |
| $CaCO_3$ | — | — | — | — | — | 78.60 | — | — | 107.16 | — | — | — | 71.44 | 142.88 |
| $CaF_2$ | — | — | — | — | — | — | — | — | — | — | — | 60.00 | — | — |
| $4MgCO_3 \cdot Mg(OH)_2 \cdot 4H_2O$ | — | — | — | 102.08 | 102.08 | — | 9.28 | — | 74.24 | — | — | 102.08 | 46.40 | 37.12 |
| $SrCO_3$ | — | — | 73.84 | — | — | — | — | 130.64 | — | — | — | — | — | — |
| $Ba(NO_3)_2$ | 64.26 | 64.26 | — | — | — | — | — | — | — | — | 47.60 | — | — | — |
| $Al(OH)_3$ | 6.43 | 6.43 | — | — | — | 36.72 | — | — | 110.16 | 30.60 | — | 104.04 | 104.04 | 67.32 |
| $B_2O_3$ | 8.40 | 8.40 | — | — | — | — | — | — | 8.00 | — | 76.00 | — | — | — |
| $Nd_2O_3$ | 12.60 | 21.00 | 16.00 | 16.00 | 16.00 | 20.00 | 16.00 | 16.00 | 16.00 | 16.00 | 16.00 | 20.00 | 16.00 | 16.00 |
| $(NH_4)NO_3$ | — | — | — | — | — | — | — | — | 25.00 | — | — | 20.00 | — | 30.00 |

The batch compositions shown in Columns 1, 2, 9, 12 and 13 of Table II yield oxide compositions in weight percent shown in Table III below and labeled Columns 1, 2, 9, 12 and 13 respectively to correspond to the same columns in Table II.

TABLE III

|  | 1 | 2 | 9 | 12 | 13 |
|---|---|---|---|---|---|
| $SiO_2$ | 64.04 | 62.02 | 52.53 | 51.52 | 60.30 |
| $Li_2O$ | — | — | — | — | 3.52 |
| $K_2O$ | 18.79 | 18.79 | — | — | — |
| $Na_2O$ | 2.02 | 2.02 | — | — | — |
| $CaO$ | — | — | 15.15 | — | 10.05 |
| $CaF_2$ | — | — | — | 15.15 | — |
| $MgO$ | — | — | 8.08 | 11.11 | 5.02 |
| $SrO$ | — | — | — | — | — |
| $BaO$ | 9.09 | 9.09 | — | — | — |
| $Al_2O_3$ | 1.01 | 1.01 | 18.18 | 17.17 | 17.09 |
| $B_2O_3$ | 2.02 | 2.02 | 2.02 | — | — |
| $Nd_2O_3$ | 3.03 | 5.05 | 4.04 | 5.05 | 4.02 |
|  | 100.00 | 100.00 | 100.00 | 100.00 | 100.00 |

The glasses formed from the ingredients are composed of ions having high field strength producing a laser glass with a high damage threshold. These glasses, also, have low tendency to form localized areas containing mobile ions and sources of internal field emission, which would lead to dielectric breakdown if greater.

TABLE IV

| Batch | 15 | 16 | 17 | 18 | 19 | 20 |
|---|---|---|---|---|---|---|
| $SiO_2$ | 272.00 | 260.00 | 284.00 | 200.00 | 280.00 | 248.00 |
| $Li_2CO_3$ | 9.88 | — | 9.88 | — | — | 9.88 |
| $NaNO_3$ | 81.12 | 54.80 | 84.96 | — | 76.72 | 65.76 |
| $K_2CO_3$ | 31.76 | 35.28 | 23.52 | 29.40 | 29.40 | 11.76 |
| $KNO_3$ | 46.44 | 77.40 | 64.48 | 146.20 | 68.80 | 137.60 |
| $Rb_2CO_3$ | — | — | — | 24.80 | — | — |
| $CaCO_3$ | — | — | 13.20 | 85.72 | — | — |
| $Ba(NO_3)_2$ | 32.64 | 40.80 | — | — | 34.00 | 40.80 |
| $Al(OH)_3$ | 9.20 | 12.24 | 8.56 | 6.12 | — | 12.24 |
| $Nd_2O_3$ | 20.00 | 16.00 | 22.00 | 24.00 | 16.00 | 20.00 |
| $Yb_2O_3$ | 6.00 | 12.00 | — | 16.00 | 4.00 | — |

Glass compositions formed from ingredients in Tables II and IV have a reduced possibility of formation of microphase separation and/or devitrification so there is a reduced likelihood of microphase separation and/or crystallization. Additionally, these glasses are composed of ions having a high field strength and have a high damage threshold.

The method of the invention includes adding a sufficient amount of an oxidizing composition of ammonia, alkali metal or alkaline earth metal salts of a mineral acid, such as nitrate salts, to maintain an oxidizing condition throughout the volume of the glass melt, through the fining and conditioning stages. This oxidizes all metallic salts to the oxide state which are maintained as oxides in the finished glass.

The method applid to the glass melts results in an increase of the damage threshold, and in one case it increased the threshold of the base glass mix from about 10 J/cm² to over 45 J/cm². In another test the damage threshold was increased from about 10 J/cm² to over 31 J/cm², based on tests made with pulses of one micro second duration.

The fining agents are selected from minerals and salts of ammonia, alkali metal, alkaline earth metals, and rare earth metals and include such salts as NaCl, $Na_2SO_4$, NaHS, $NH_4NO_3$, KBr, KI, $CeO_2$, etc. The conventional fining agents antimony oxide ($Sb_2O_3$) and arsenic oxide ($As_2O_3$) are not used since they may be readily reduced, at the temperature necessary to melt glass, to the metal forming localized metallic particles.

The laser glass of the invention is characterized by a high damage threshold; having no metallic inclusions of either the noble metals or of such base metals as antimony and arsenic, the oxides of which are readily reduced to the metallic state; without local semi-conductive inclusions of such compounds as ZnS, PbS, ZnO, CdS, etc.; with a greatly reduced tendency toward microphase separation and/or devitrification whereby there are no localized areas formed having a higher concentration of mobile ions such as Na+ in the glass matrix; and without occurrance of localized internal field emission of electrons.

We claim:

1. A laser glass comprised of the following metal oxide compositions:

| | |
|---|---|
| $SiO_2$ | 64.04 weight percent |
| $K_2O$ | 18.79 weight percent |
| $Na_2O$ | 2.02 weight percent |
| $BaO$ | 9.09 weight percent |
| $Al_2O_3$ | 1.01 weight percent |
| $B_2O_3$ | 2.02 weight percent |
| $Nd_2O_3$ | 3.03 weight percent. |

2. A laser glass comprised of the following metal oxide compositions:

| | |
|---|---|
| $SiO_2$ | 62.02 weight percent |
| $K_2O$ | 18.79 weight percent |
| $Na_2O$ | 2.02 weight percent |
| $BaO$ | 9.09 weight percent |
| $Al_2O_3$ | 1.01 weight percent |
| $B_2O_3$ | 2.02 weight percent |
| $Nd_2O_3$ | 5.05 weight percent. |

3. A laser glass comprised of the following metal oxide compositions:

| | | |
|---|---|---|
| SiO$_2$ | 52.53 | weight percent |
| CaO | 15.15 | weight percent |
| MgO | 8.08 | weight percent |
| Al$_2$O$_3$ | 18.18 | weight percent |
| B$_2$O$_3$ | 2.02 | weight percent |
| Nd$_2$O$_3$ | 4.04 | weight percent |

4. A laser glass comprised of the following metal compounds:

| | | |
|---|---|---|
| SiO$_2$ | 51.52 | weight percent |
| CaF$_2$ | 15.15 | weight percent |
| MgO | 11.11 | weight percent |
| Al$_2$O$_3$ | 17.17 | weight percent |
| Nd$_2$O$_3$ | 5.05 | weight percent. |

5. A laser glass comprised of the following metal oxide compositions:

| | | |
|---|---|---|
| SiO$_2$ | 60.30 | weight percent |
| Li$_2$O | 3.52 | weight percent |
| CaO | 10.05 | weight percent |
| MgO | 5.02 | weight percent |
| Al$_2$O$_3$ | 17.09 | weight percent |
| Nd$_2$O$_3$ | 4.02 | weight percent. |

* * * * *